United States Patent [19]
Quiroga

[11] Patent Number: 5,761,892
[45] Date of Patent: Jun. 9, 1998

[54] ROTARY MOWER

[76] Inventor: Osvaldo R. Quiroga, Casilla de Correo 1286, Cochabamba, Bolivia

[21] Appl. No.: 607,158

[22] Filed: Feb. 26, 1996

[51] Int. Cl.⁶ .................................................. A01D 34/44
[52] U.S. Cl. .............................. 56/17.5; 56/295; 56/255; 56/DIG. 20
[58] Field of Search ................... 56/255, 295, DIG. 17, 56/DIG. 20, 17.5

[56] References Cited

U.S. PATENT DOCUMENTS

| | | |
|---|---|---|
| 5,931 | 11/1848 | Boone . |
| 162,082 | 4/1875 | Lorey . |
| 431,836 | 7/1890 | Bockus . |
| 578,666 | 3/1897 | Thornburg . |
| 597,972 | 1/1898 | Graham . |
| 703,513 | 7/1902 | Adams et al. . |
| 806,780 | 12/1905 | Dain . |
| 1,351,185 | 8/1920 | Muzzy . |
| 1,368,503 | 2/1921 | Kallauner . |
| 1,576,878 | 3/1926 | Thynne . |
| 2,032,701 | 3/1936 | Jones . |
| 2,149,463 | 3/1939 | Orr . |
| 2,190,578 | 2/1940 | Todd . |
| 2,592,269 | 4/1952 | Getz . |
| 2,633,688 | 4/1953 | Yeck et al. . |
| 2,720,071 | 10/1955 | Watanabe . |
| 2,924,259 | 2/1960 | Beeston, Jr. ............... 56/295 |
| 2,931,156 | 4/1960 | Fulwider . |
| 2,942,397 | 6/1960 | Clark . |
| 3,073,101 | 1/1963 | Beaman et al. . |
| 3,093,952 | 6/1963 | Bonser ............................ 56/295 |
| 3,184,907 | 5/1965 | Harloff . |
| 3,321,026 | 5/1967 | Hubbard . |
| 3,408,801 | 11/1968 | Kroll . |
| 3,724,182 | 4/1973 | Long et al. . |
| 3,971,196 | 7/1976 | Stevenson . |
| 3,998,037 | 12/1976 | Deans et al. ..................... 56/295 |
| 4,229,933 | 10/1980 | Bernard . |
| 4,245,456 | 1/1981 | Zipfel . |
| 4,297,831 | 11/1981 | Pioch ........................................ 56/295 |
| 4,306,407 | 12/1981 | Dambroth . |
| 4,322,938 | 4/1982 | Efflandt . |
| 4,429,518 | 2/1984 | Fedeli ....................................... 56/295 |
| 4,578,938 | 4/1986 | Genesco ................................... 56/295 |
| 4,631,455 | 12/1986 | Taishoff . |
| 4,631,910 | 12/1986 | Doyen et al. . |
| 4,711,077 | 12/1987 | Kutsukake et al. . |
| 4,715,173 | 12/1987 | Anderson . |
| 4,736,576 | 4/1988 | Mallaney et al. . |
| 4,779,407 | 10/1988 | Pattee . |
| 5,123,236 | 6/1992 | Bablitz . |
| 5,167,109 | 12/1992 | Meinerding . |
| 5,210,998 | 5/1993 | Hojo et al. . |
| 5,233,820 | 8/1993 | Willsie . |
| 5,274,987 | 1/1994 | Wiener . |
| 5,291,725 | 3/1994 | Meinerding . |
| 5,311,727 | 5/1994 | Fassauer . |
| 5,325,657 | 7/1994 | Bevis . |
| 5,375,400 | 12/1994 | Darden . |
| 5,402,629 | 4/1995 | Masaru . |
| 5,444,968 | 8/1995 | Barton . |
| 5,467,586 | 11/1995 | Lin et al. . |

*Primary Examiner*—Terry Lee Melius
*Assistant Examiner*—Heather Shackelford
*Attorney, Agent, or Firm*—Jeffrey L. Thompson

[57] ABSTRACT

A rotary blade for a rotary mower that provides an equivalent cut with a substantial reduction in necessary driving power, and a method of implementing the same to reduce the necessary driving power of a preexisting mower. The rotary blade includes a support arm fixedly disposed symmetrically about a rotary drive shaft, at a height sufficient to avoid contact with vegetation cut by the blade, such that the rotary drive shaft rotates the support arm about an axis. The rotary blade also includes several cutting elements attached to the support arm which have respective longitudinal axes that project downward from the support arm to a predetermined distance such that the cutting elements are positioned to avoid contact with the ground.

25 Claims, 9 Drawing Sheets

CUTTING PATH WIDTH

ROTARY MOWER

FIELD OF THE INVENTION

This invention relates to an improved rotary mower for cutting vegetation, such as grass lawns. More particularly, this invention relates to a rotary blade for a rotary mower that provides an equivalent cut with a substantial reduction in necessary driving power, and a method of implementing the same to reduce the necessary driving power of a preexisting mower.

BACKGROUND OF THE INVENTION

Many conventional rotary mowers utilize a cutting blade which rotates in a substantially horizontal plane. Commonly, the blade is symmetrically shaped with substantially planar top and bottom surfaces. Outer portions of the blade are sharpened to provide an edge for cutting grass or other vegetation. An example of such a conventional blade is shown in FIG. 9A. The blade is attached to a drive shaft which rotates. As the mower is moved across a lawn or similar area, the rotating, sharpened edges cut the vegetation to a width defined by the length of the blade independently of the length of the sharpened outer ends.

Most such rotary mowers utilize a motor to provide rotational driving power to the blade. In order to obtain a clean cut, the blade is driven at a relatively high rate of rotation. While varying with the particular dimensions of the cutting blades, a typical manually propelled rotary mower with a twenty inch cut utilizes an internal combustion motor of 3 to 4 horsepower to provide the driving power required to maintain a high rotational velocity. Most new push mowers have increased the size of the driving motors to 5 and even 6 horsepower.

Various adaptations and modifications to this basic design have been proposed. In particular, there have been many prior art attempts to address the problems associated with dulling of the sharpened edge of the cutting member. For example, U.S. Pat. No. 4,779,407 to Pattee describes a rotary member which employs relatively inexpensive, disposable cutting components that are intended to be frequently replaced. U.S Pat. No. 5,467,586 to Lin et al. similarly proposes the use of detachably affixed cutting blades. U.S. Pat. No. 4,715,173 to Anderson describes an accessory bar to which are attached various components for cutting, mulching and raking a lawn. Other prior art devices, such as described in U.S. Pat. No. 4,229,933 to Bernard, similarly address the problem of dulling by simplifying the task of removing and reattaching the blade for sharpening.

Many other prior art rotary mowers have been proposed to perform additional tasks beyond the cutting function provided by horizontally disposed cutting surfaces. For example, U.S. Pat. No. 2,720,071 to Watanabe describes a rotary blade having sharpened protrusions which extend into turf to uproot and cut low growing runners. U.S. Pat. No. 2,942,397 to Clark refers to tiller projections which extend downwardly to "power renovate" or "power rake" the soil. U.S. Pat. No. 3,321,026 to Hubbard, U.S. Pat. No. 3,724,182 to Long et al. and U.S. Pat. No. 4,306,407 to Dambroth each similarly utilize downwardly directed tines or projections to rake or scarify the soil.

A variety of structures have also been proposed to provide a "mulching" of cut grass. Such devices include U.S. Pat. Nos. 5,167,109 and 5,291,725 to Meinerding which describe additional cutting edges attached to a horizontal blade to finely shred vegetation. U.S. Pat. No. 5,375,400 describes a plurality of triangular-shaped cutting blades extending perpendicularly to a square mounting section to mulch a high volume of cut vegetation. Additionally, the above-noted patent to Anderson describes an accessory to mulch previously cut vegetation.

While improving upon particular aspects of the basic horizontal cutting blade used in rotary mowers, the above-mentioned prior art devices generally share a relatively high power requirement to ensure proper cutting and to perform such additional tasks such as mulching, shredding or raking a lawn. This power requirement results from a number of different factors. First, several surfaces of the conventional mower, including the cutting blade comes into contact with the vegetation. This results in a relatively large amount of friction causing considerable power requirements to rotate the blade and to move the mower forward.

Moreover, due to the forward translation of the mower (Vt), there is both a longitudinal movement of the blade along with a rotational movement of the blade. Since only the outer portions of the conventional blade are sharpened, there is an irregular coverage of the area to be cut inside the cutting path. As seen in FIG. 9B, the outer parts of the cutting path will have many repetitive and overlapping passes in relation to the few necessary passes to cover the center portion of the cutting path. In order to better illustrate the irregular covering of the inside area of the cutting path, the track of only one of the two outer sharpened edges of the conventional mower blade of FIG. 9A is shown in FIG. 9B. The sharpened edge of the opposite end will have a mirror image path (displaced by the length of advance corresponding to ½) of the shown path, more or less filling the blanks seen in FIG. 9B as well as further repeating the tracks of the outer ends of the cutting path.

Even after an area of vegetation has been cut by the blade, friction is applied to the blade each time it subsequently scales a previously cut area, causing a dissipation of energy. Since the cutting blade is substantially horizontal, a relatively large area of the blade rubs against the vegetation. The amount of excess power required as a result of this effect is proportional to the number of times the blade subsequently scales this previously cut portion, and also proportional to the radial distance from the center to the cutting edges (higher torque at outer ends). Since conventional mowers have blades rotating at large angular velocities in order to ensure a proper cut, the power demand becomes more pronounced.

This power requirement associated with prior art mowers results in several drawbacks. For example, it is generally necessary to utilize a relatively large internal combustion motor to obtain a desired level of cutting, mulching, raking, and so forth. The size and weight of such a power source further reduces the handling and ease of use of the mower, and also contributes to greater expense in manufacturing, sales (e.g., because of increased storage demand and difficulty in transport) and day-to-day use. In addition to the expense resulting from increased energy consumption, larger internal combustion motors also are characterized by increased exhaust emissions which detrimentally affect the quality of the environment.

SUMMARY OF THE INVENTION

The present inventor has recognized that as a conventional mower is moved across an area, a substantial portion of the vegetation to be cut, particularly the low growing vegetation, is not typically disposed perpendicularly with respect to the ground as it encounters the cutting blade of the mower. Rather, various strands of this vegetation are bent over or matted down. As a result, a substantial volume of the vegetation is not located at an ideal position with respect to the cutting member in conventional mowers (that is, in a position perpendicular to the cutting edge of the blade). Even if the vegetation is upraised either naturally or by a suction effect created by the rotational movement of the horizontal cutting blade, a substantial amount of the vegetation contacts portions of the blade. As described earlier, since the vegetation comes into contact with the bottom surface of the conventional mower, substantial friction results. Friction also results from the substantially horizontal position of the blade as it rotates at high speed in contact with the underlying vegetation. This produces a drag against both the rotational movement of the cutting blades and the forward movement of the mower which, in turn, cause increased power demand. These effects are shown in FIGS. 10A and 10B where a matted grass is being dragged by the blade instead of being cut by it.

In view of these drawbacks and limitations, a principal object of the present invention is to provide a rotary mower which obtains an equivalent cut in comparison with conventional mowers but with a substantial reduction in power requirements and energy consumption. This object is achieved by reducing the area of the blade which comes into contact with the vegetation and also reducing the resistance to the cut itself by properly locating the relatively few and short sharpened edges of the cutting elements. This significantly reduces the friction applied to the blade by such vegetation as seen in FIG. 5A. Moreover, the power is reduced by providing sharpened cutting elements at other sections of the blade in addition to the outer portion. This allows for a thorough cut of the area of vegetation under the span area of the blade substantially reducing the larger torque and the repetitious scaling of previously cut areas as mentioned above in the discussion of the conventional mowers.

A related object is to provide a method of adapting preexisting mower designs to maintain an equivalent cut as a conventional mower, but with a substantial decrease in the power supply requirement.

Directed towards achieving these objects and others, described is a blade for a rotary mower comprising a support arm fixedly disposed symmetrically about a rotary drive shaft at a height sufficient to avoid contact with vegetation cut by the blade, the rotary drive shaft rotating the support arm about an axis, a plurality of cutting elements attached to the support arm which project downward from the support arm to a distance such that the cutting elements are positioned to avoid contact with the ground. The cutting elements each having a sharpened surface disposed at a substantially acute angle relative to the axis of rotation of the drive shaft whereby vegetation is cut as the blade rotates and moves forward across an area of vegetation.

According to one aspect of the invention, the sharpened surface of each cutting element is disposed at an acute angle relative to a transverse axis of the support arm.

According to one embodiment of the invention, the sharpened surface defines a straight edge.

According to another embodiment of the invention, the sharpened surface defines a curved edge.

According to another aspect of the invention, the acute angle relative to the axis of rotation of the drive shaft is between 20° and 50°, and preferably about 40°.

According to yet other aspects of the invention, the cutting elements are arranged either provided symmetrically or asymmetrically along the support arm.

According to still another aspect of the invention, a matting means, formed by the bending of the front end of the frame in a curved shape, is provided for bending relatively tall vegetation as the mower is moved forward thus reducing drag applied to the front of the mower, whereby a portion of the vegetation is positioned substantially perpendicularly to the cutting elements as the cutting elements rotate about the drive shaft.

Also described herein is a method of reducing rotational and translational drag in a rotary mower comprising the steps of removing a first substantially planar cutting blade formerly attached to a rotary drive shaft of the mower; and replacing the first cutting blade with a second blade; wherein the second blade includes a support arm fixedly disposed symmetrically about the rotary drive shaft at a height sufficient to avoid contact with vegetation cut by the blade, the rotary drive shaft rotating the support arm about an axis; a plurality of cutting elements attached to the support arm which project downward from the support arm to a distance such that the cutting elements are positioned to avoid contact with the ground, the cutting elements each having a sharpened surface disposed at a substantially acute angle relative to the axis of rotation of the drive shaft whereby vegetation is cut as the blade rotates and moves forward across an area of vegetation.

According to one aspect of the invention, this method further includes a step of replacing an original power source (such as an internal combustion motor) which rotates said rotary drive shaft with a substitute power source that operates at a substantially reduced power level (such as a smaller internal combustion motor or an electric motor) to drive the second blade which has a smaller rotational drag than the first blade.

Other objects and features of the invention will become apparent from the following description of preferred embodiments of the present invention.

BRIEF DESCRIPTION OF THE DRAWINGS

The invention and its advantages will be more fully described by way of example in the following description of the invention as illustrated in the accompanying drawings in which.

DETAILED DESCRIPTION OF THE PREFERRED EMBODIMENTS

Figure 1:
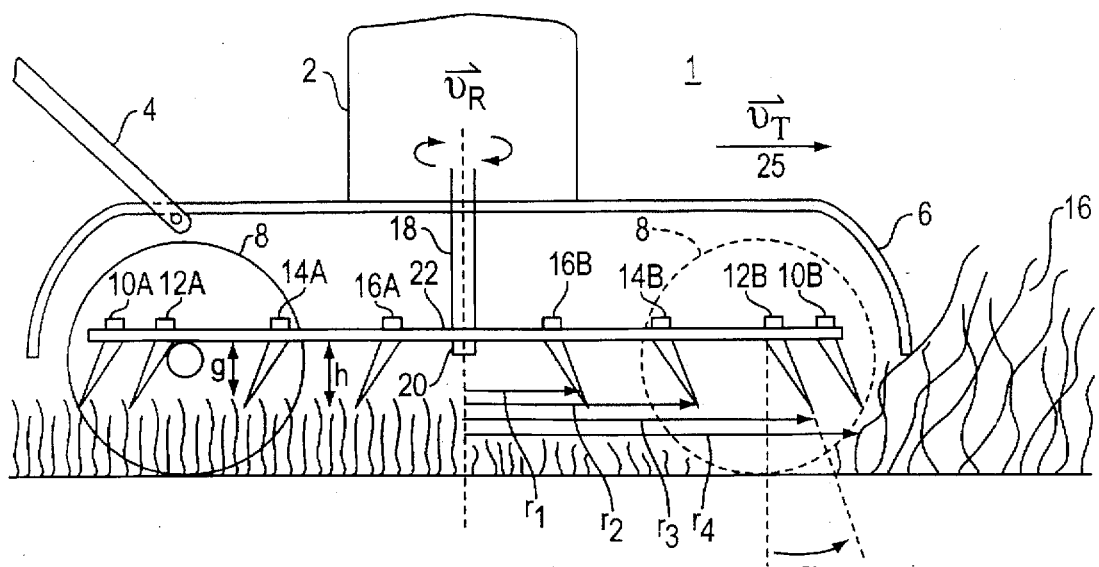
FIG. 1 is side view of a rotary mower utilizing a rotating blade in accordance with an embodiment of the present invention.
Figure 2:
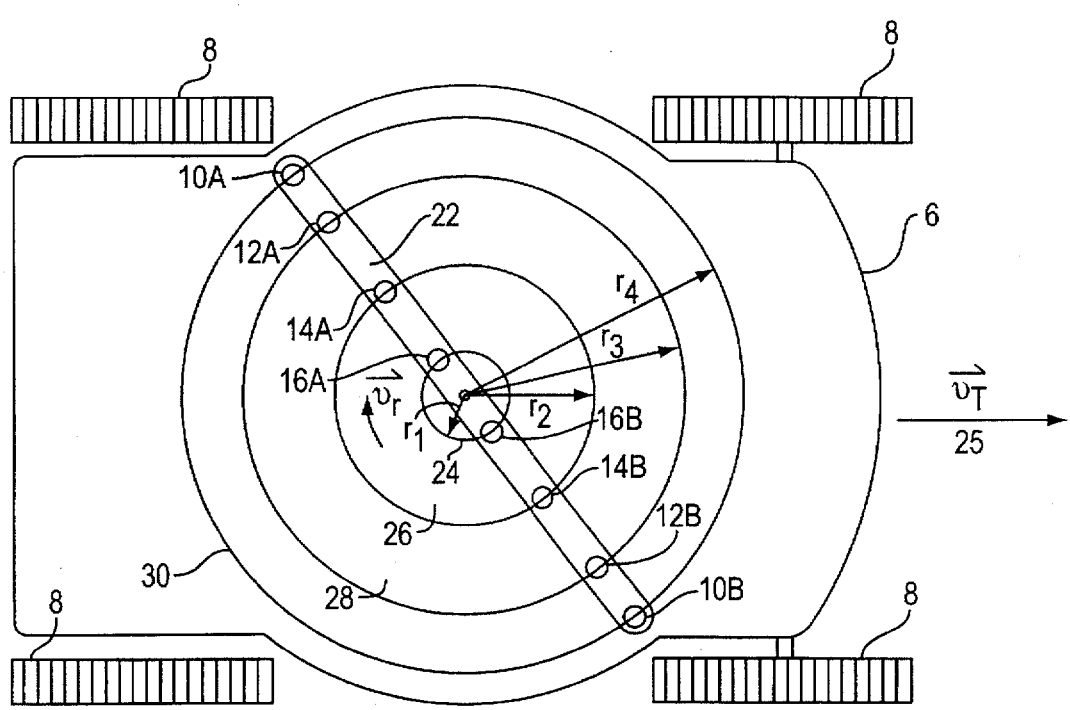
FIG. 2 is a top plan view of the rotary mower shown in FIG. 1.

FIGS. 1 and 2 illustrate a manually propelled rotary mower 1 according to a preferred embodiment of the present invention. While many features common to conventional rotary mowers are omitted for convenience, it will be appreciated by those skilled in the art that the example shown may be readily adapted to include such conventional features. It will also be understood that the below described features are equally applicable to a power propelled mower.

The rotary mower 1 shown in FIGS. 1 and 2 includes a handle 4 attached to a rear portion of a frame 6. The frame 6 is supported by four wheels 8. By pushing the handle, the rotary mower may be moved with a translation velocity $v_T$ in a forward direction 25. A motor 2, for example, an internal combustion motor or an electric motor, disposed on a top surface of the frame 6 rotates a drive shaft 18 with a rotational velocity $v_R$.

A rotary support arm 22 is affixed to the drive shaft 18 with a conventional fastener 20. The longitudinal axis of the support arm 22 is disposed in a horizontal plane which lies parallel to the ground over which the mower is pushed. This rotary support arm is set at a height which is higher than the vegetation that has been cut in order to avoid contact between the support arm and such vegetation. This arrangement, which can best be seen by the exploded view of Fig. 5A, results in reduced drag applied to the mower blade by the vegetation. The support arm 22 according to the invention includes four pairs of cutting elements 10A, 10B, 12A, 12B, 14A, 14B, 16A and 16B fixedly attached along the support arm 22 in a downward or near vertical direction. Any conventional fastener, such as a bolt may be utilized to affix the cutting elements.

The cutting elements shown in this example include a first pair 10A and 10B disposed at a radial distance $r_4$ as measured from the axis of rotation of the support arm 22. A second pair 12A and 12B are disposed at a radial distance $r_3$, a third pair 14A and 14B are located at a radial distance of $r_2$, while a fourth pair 16A and 16B are located at a radial distance of $r_1$. Thus, while the rotary mower 1 is stationary, the first pair of cutting elements 10A and 10B rotate along a first circular path 30; the second pair of cutting elements 12A and 12B rotate along a second circular path 28; the third pair of cutting elements 14A and 14B rotate along a third circular path 26; and the fourth pair of cutting elements 16A and 16B rotate along a fourth circular path 24.

As explained in greater detail herein, different arrangements of cutting elements may be advantageously used in accordance with the invention. In the example shown in FIGS. 1 and 2, the cutting elements 10A, 10B, 12A, 12B, 14A, 14B, 16A and 16B are arranged symmetrically in order to obtain dynamic balance as the support arm 22 rotates. However, certain advantages may be obtained by using a plurality of asymmetrically arranged cutting elements with corresponding balancing counterweights as shown by reference numeral 57 in FIGS. 6A and 6B.

As shown in FIG. 1, the longitudinal axis of each cutting element is fixedly oriented in a near vertical downward direction toward the ground. In the example shown, each cutting element is inclined outwardly at an angle $\alpha$ with respect to the vertical axis of rotation (which is concentric with the longitudinal axis of the drive shaft 18). This angle may be, for example, between 0° and 60°. However, as explained in greater detail below, it has been found that an angle $\alpha$ of between 30° and 50°, and preferably about 40°, significantly reduces drag while providing a suitable cut in comparison with a conventional rotary mower driven by a larger motor. This angle further facilitates outward propulsion of vegetation that is cut thereby minimizing accumulation of such vegetation on the blade.

Figure 3:
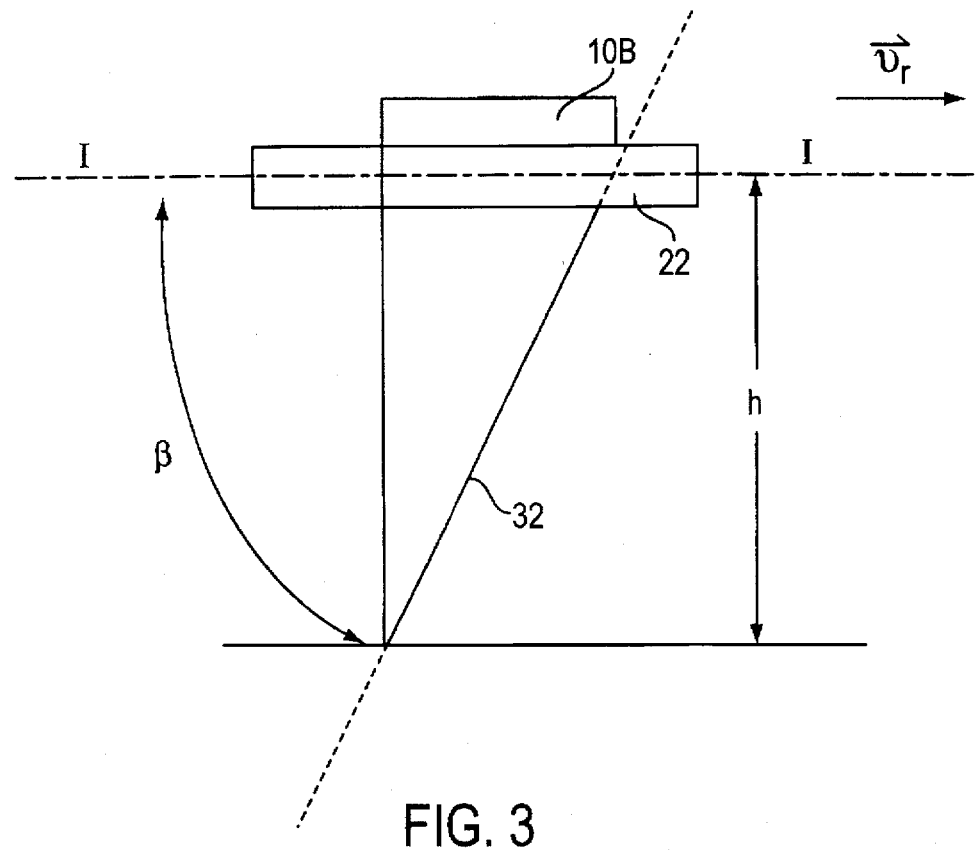
FIG. 3 is a front end view of a cutting element shown in FIG. 1.

As best seen in FIG. 3, a first embodiment of the invention shows one of the cutting elements 10B of the above-described mower. This cutting element has a cutting edge 32 which is inclined relative to the transverse axis of the rotary arm, designated as axis I—I in FIG. 3. The cutting edge 32 is brought into contact with vegetation 16 as the mower is moved forward and as the support arm moves about its axis of rotation. The cutting elements thereby cut the vegetation 16 down to a height h as measured from the position of the support arm 22.

Figure 4:
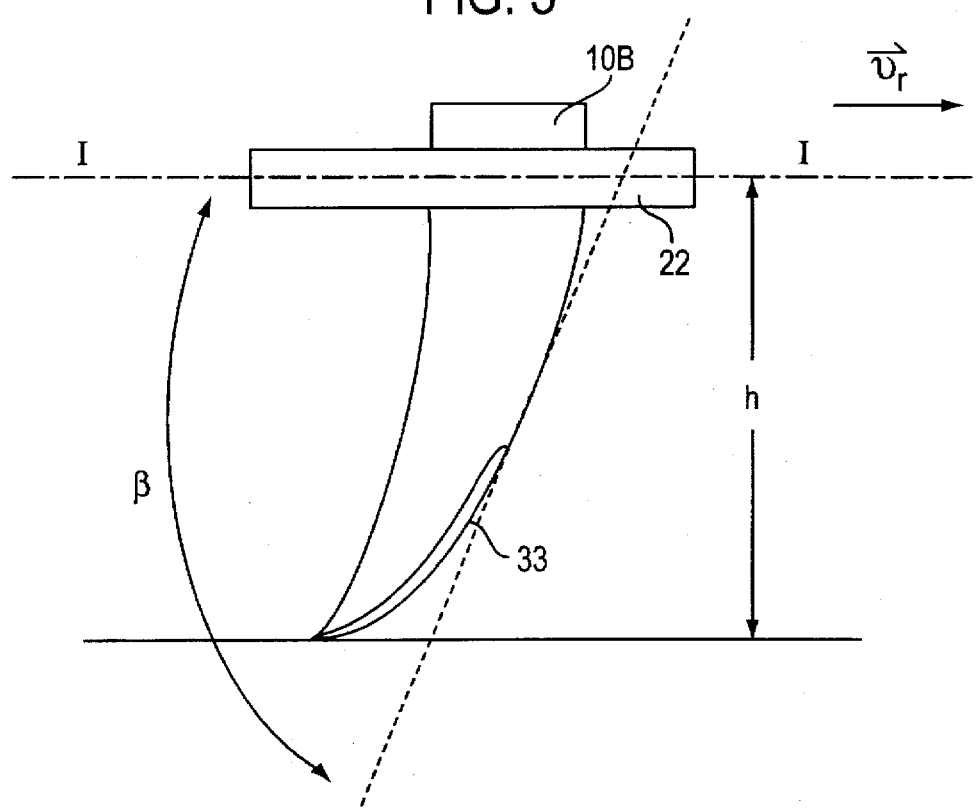
FIG. 4 is a front end view of a second embodiment of the cutting element of FIG. 1.

FIG. 4 shows a cutting element according to a second embodiment of the invention which has a curved-shaped, sharpened cutting edge 33.

As seen in FIGS. 3 and 4, an acute angle $\beta$ is formed between the transverse axis I—I of the support arm 22 and the cutting edge of the cutting element. This particular arrangement of the cutting element minimizes any accumulation of grass on the cutting surface (32 or 33) by facilitating a downward dropping of the grass, thus minimizing drag on the cutting element caused by such accumulation.

It has been discovered through the Applicant's theoretical research and experimentation that the rotary mower 1 according to the example shown in FIGS. 1 to 2 requires substantially less power to operate in comparison to a conventional rotary mower with a similar cutting diameter.

In contrast with a conventional blade having a substantially horizontal cutting surface, the downwardly disposed cutting elements of the present invention are ideally positioned to cut across the matted vegetation at a height h measured downwardly from the plane of the support arm as seen in FIG. 1. This permits matted or bent vegetation to be cut where it might otherwise not be by a horizontally positioned blade (particularly where the vegetation is long). Moreover, the cutting elements of the invention provide a reduced area that rubs or drags against the vegetation in comparison with horizontally disposed cutting surfaces. Further, since the support arm is positioned at a height g above the top of the vegetation which has already been cut, there is a significant reduction of friction on the support arm caused by vegetation brushing against it (see FIGS. 1, 5 and 5A). As a result, a substantial reduction in overall drag is obtained. This in turn results in a significant reduction in the size and power of the motor 2 necessary to drive the support arm 22.

In contrast to prior art scarifying, renovating and raking devices, the cutting elements of the present invention are fixedly positioned above the ground at a height sufficient to uniformly cut the top portions of the vegetation while avoiding the roots or tendrils of the vegetation or the underlying soil. This avoids the resulting drag effect that is otherwise encountered.

Figure 5:
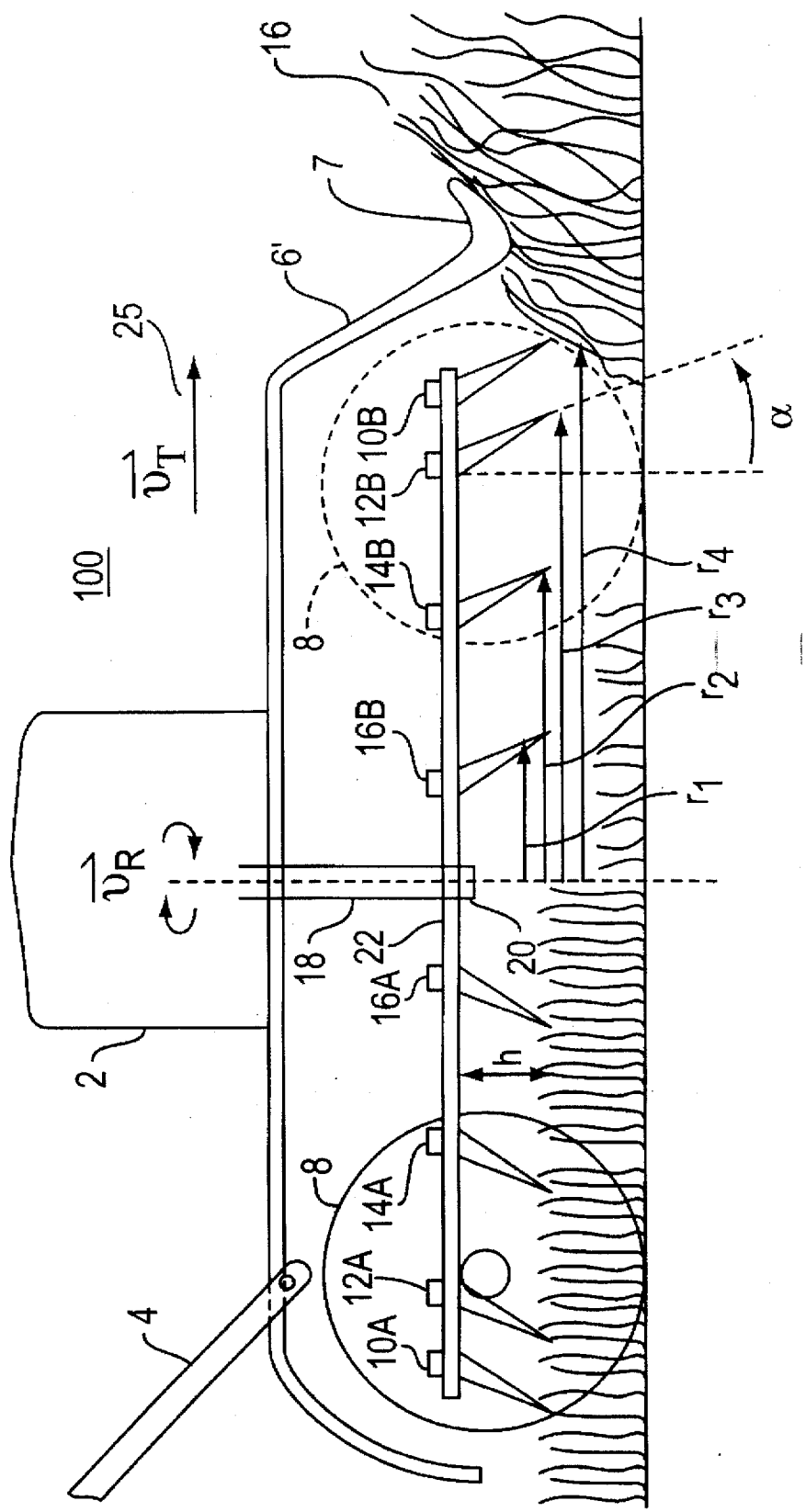
FIG. 5 is side view of a rotary mower in accordance with the present invention which has a frame that includes a matting means.

FIG. 5 illustrates a rotary mower 100 according to the invention in which the frame 6' of the mower 100 has been modified in comparison to the foregoing example.

Specifically, in this example, the frame 6' includes a matting means 7 for bending the vegetation 16 that is to be cut, particularly relatively high grass. In this example, an additional extension portion 7 of the frame 6' provides this matting function while also reducing drag. As a result of this modification, a greater portion of the vegetation to be cut is ideally positioned for a clean cut with the downwardly positioned cutting elements 10A, 10B, 12A, 12B, 14A, 14B, 16A and 16B.

Figure 5A:
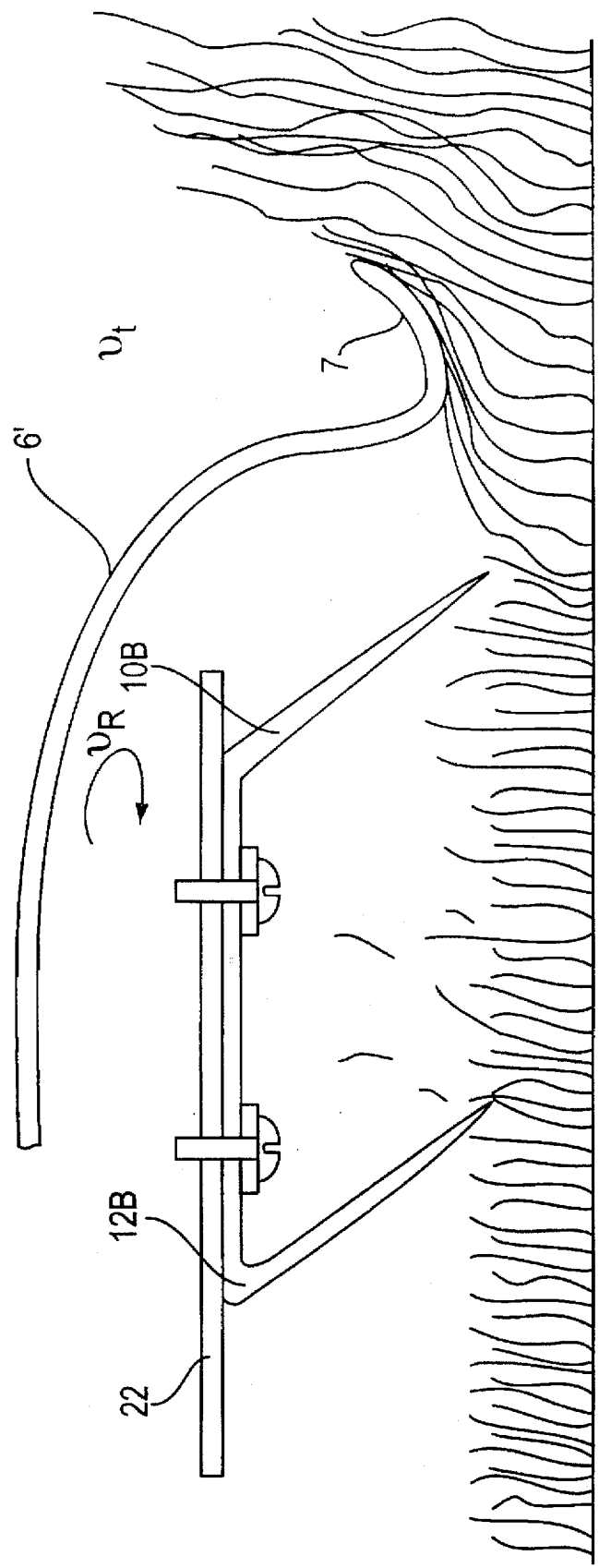
FIG. 5A is an exploded view of a section of FIG. 5 showing vegetation coming into contact with a cutting element of the blade of the rotary mower of FIG. 5.

FIG. 5A is an exploded view of a section of FIG. 5 showing vegetation coming into contact with a cutting element of the blade of the rotary mower of FIG. 5.

Figure 6A:
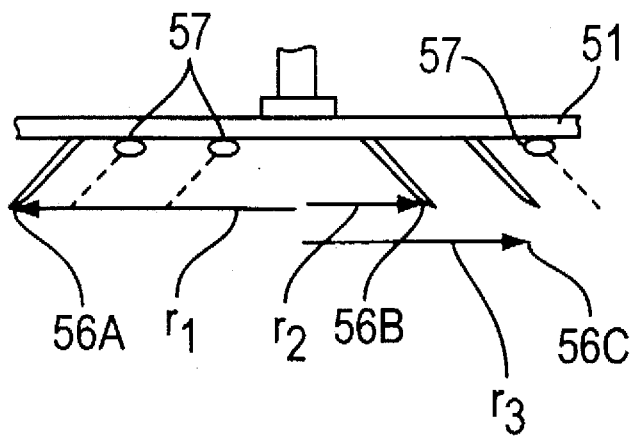
FIGS. 6A and 6B are respective side views of two rotary arms according to alternative embodiments of the invention.
Figure 6B:
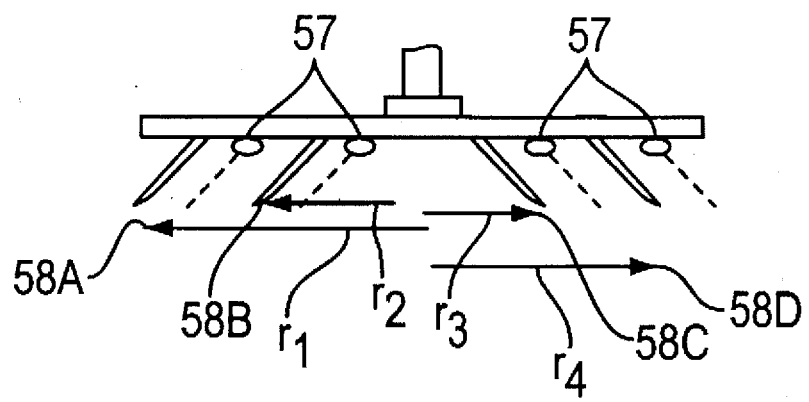

The present invention is not limited to the specific quadruple pair arrangement of cutting elements that is described in the foregoing examples. Rather, it has been discovered that alternate arrangements of cutting elements may be utilized. FIGS. 6A and 6B illustrate two examples of mower blades which may be used depending on the type of cut which is desired. As illustrated with these examples, a cleaner, more polished cut may be obtained where the cutting elements are arranged asymmetrically to avoid duplicative cutting. The quality of the cut may also be adjusted by varying the translational speed of the mower in relation to the rotational speed of the supporting arm.

FIG. 6A illustrates an example in which three cutting elements 56A, 56B and 56C are positioned asymmetrically along the support arm 51 at respective radial distances $r_1$, $r_2$ and $r_3$. In FIG. 6B, four cutting elements 58A, 58B, 58C, 58D are positioned at respective radial distances $r_1$, $r_2$, $r_3$, $r_4$.

Figure 7B:
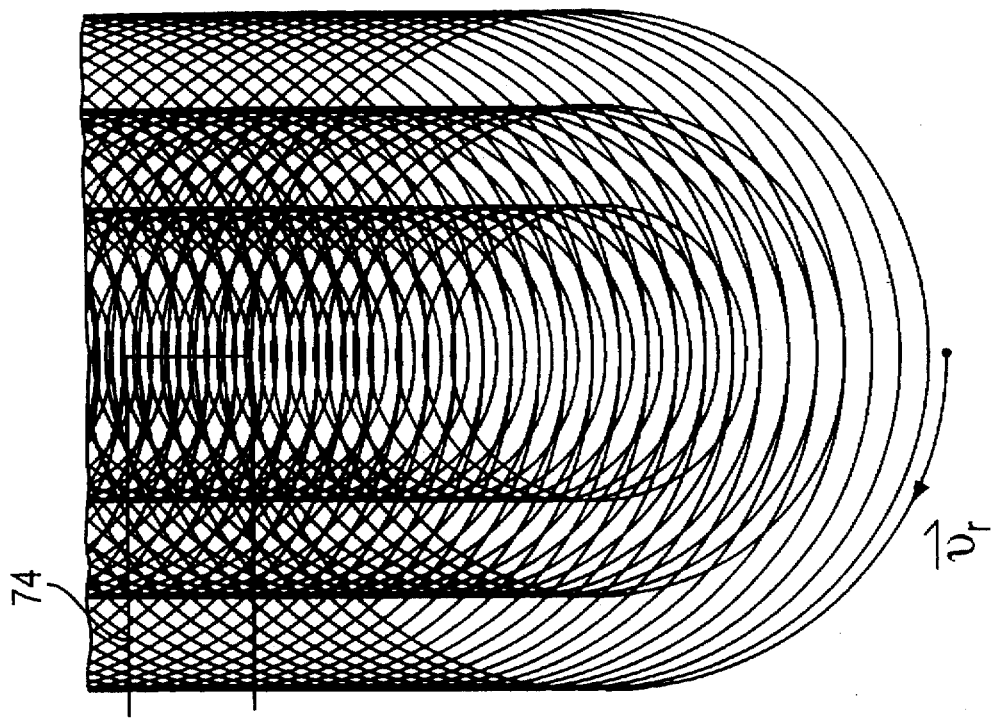
FIGS. 7A and 7B are comparative graphical illustrations of lower tips of cutting paths obtained by cutting elements of the present invention, respectively for one outer end cutter and for three cutters radially distributed.
Figure 7A:
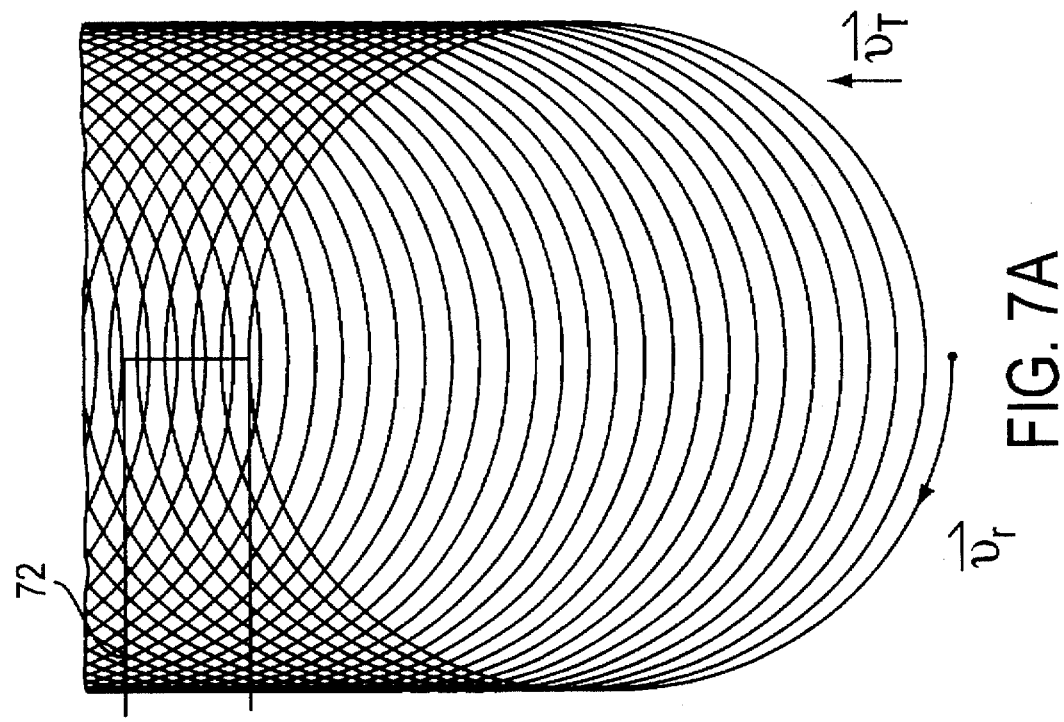

To aid in understanding a principle of the invention, FIGS. 7A and 7B are graphical representations of the respective paths of cutting elements as they are rotated at a rotational speed $v_R$ corresponding to approximately 3000 rpm and a translational speed $v_T$ of approximately one m/s. In each example, a cutting element is provided at a distal end of the supporting arm 51 which results in a cut having a width of twenty inches.

In the cutting element arrangement resulting in the graphical representation of FIG. 7A, only one cutting element is on the support arm. The radial distance $r_1$ of the cutting element is approximately ten inches resulting in a cutting width of twenty inches. In the cutting element arrangement resulting in the graphical representation of FIG. 7B, three cutting elements are arranged asymmetrically at radial distances $r_1$ to $r_3$ which range from 3.5 inches to ten inches.

Figure 8A:
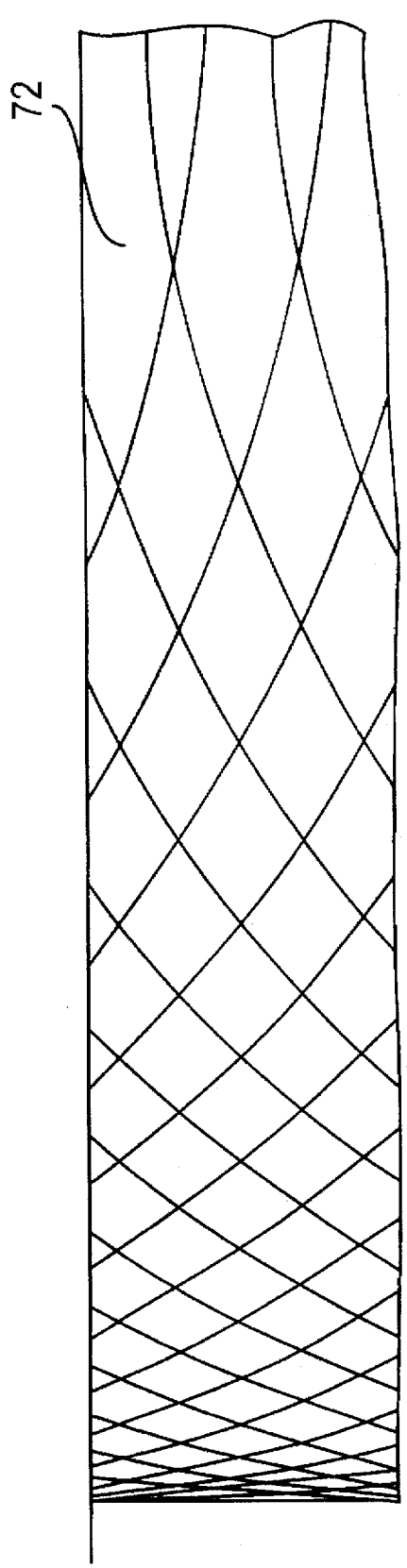
FIGS. 8A and 8B are more detailed views of respective portions of the graphical illustrations of FIGS. 7A and 7B.
Figure 8B:
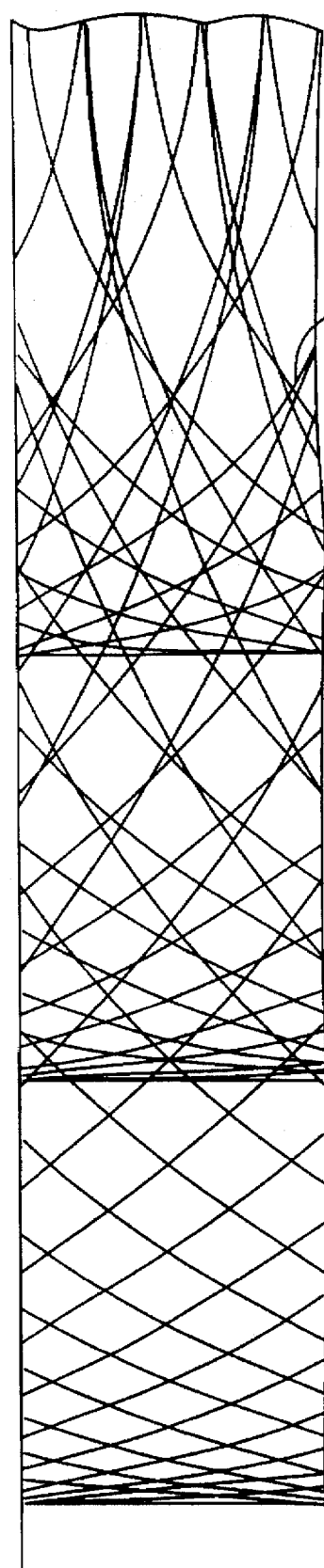
Figures 9A, 9B:
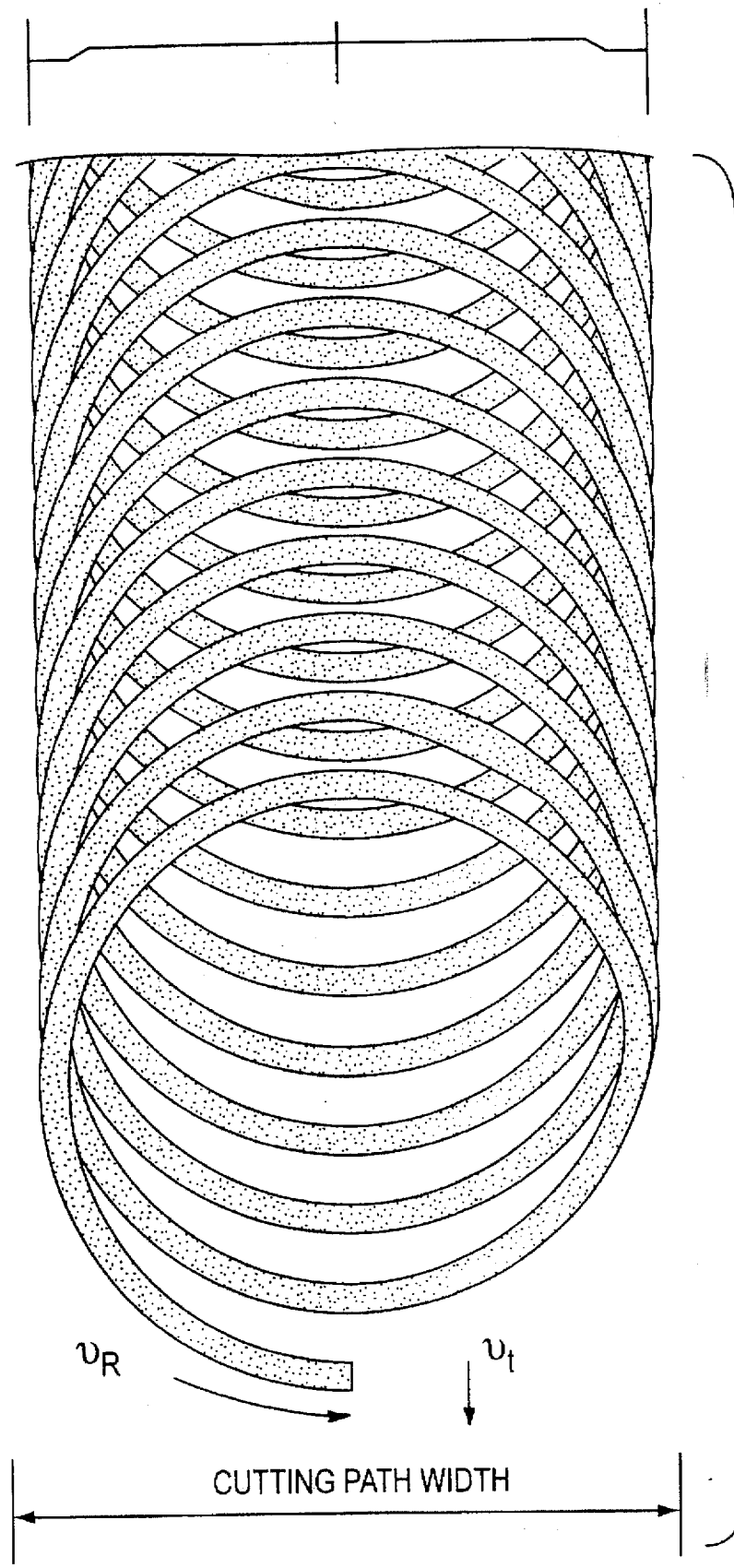
FIG. 9A shows a conventional cutting blade used in rotary mowers.
FIG. 9B shows a graphical illustration of a cutting path obtained by one of the two outer sharpened edges of the conventional cutting blade of FIG. 9A.
Figure 10A:
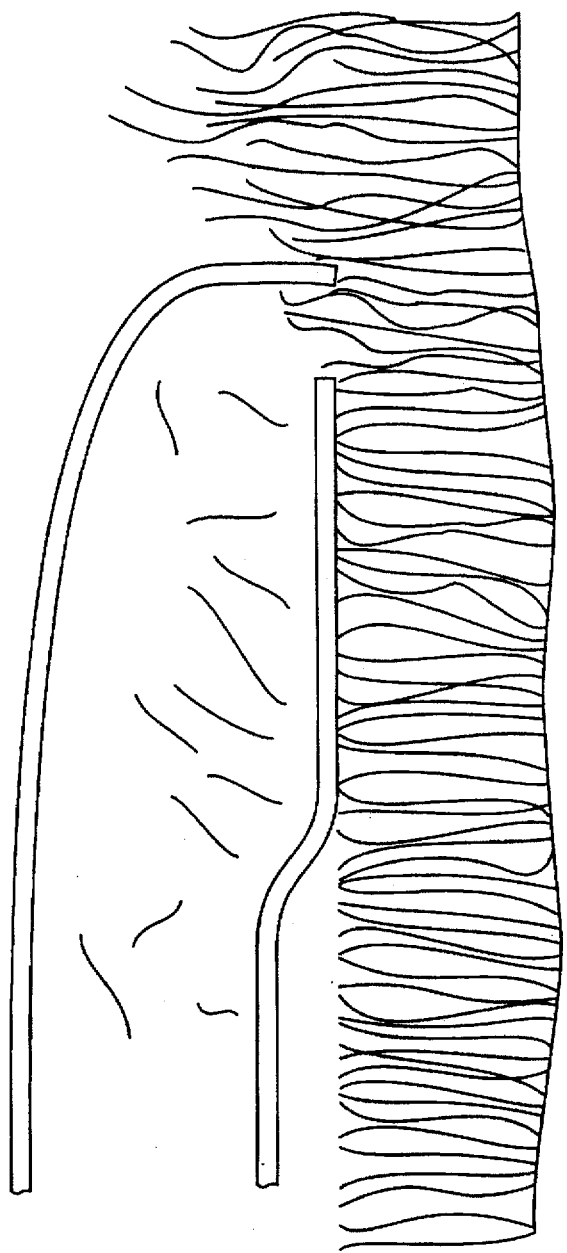
FIGS. 10A and 10B are views of vegetation coming into contact with a conventional rotary mower.
Figure 10B:
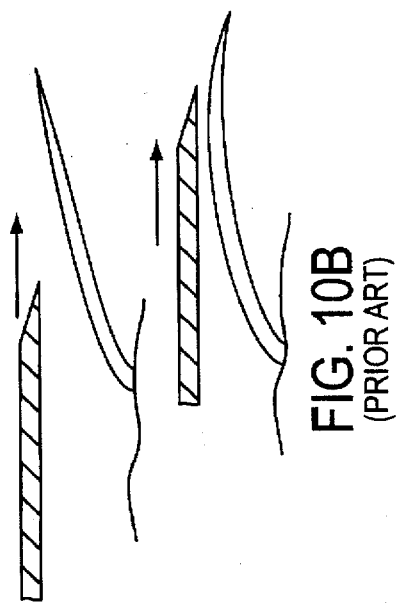

As made apparent from the graphical illustrations of FIGS. 7A and 7B, and the respective exploded portions 72 and 74 of these figures as set forth in FIGS. 8A and 8B, it can be appreciated that a greater portion within the area to be cut is covered by the inclusion of additional cutting members as indicated by the increased number of lines in FIG. 8B as compared with FIG. 8A. The precise number to be used depends on the type of vegetation to be cut, and the quality of the cut that is desired.

It has been found that the amount of power required by the rotary mower is not increased by providing additional sharpened cutting elements according to the invention at other sections of the support arm in addition to the outer portion since the inner cutting elements are performing work that would otherwise need to be done by the outer cutting element which has a larger rotational distance from the rotary shaft and thus a larger torque than the inner cutting elements.

Furthermore, by providing these elements, a thorough cut of the area of vegetation under the inner span area of the blade is obtained without the need to increase the rotational rate of the blade as is otherwise necessary as explained above in the discussion of the conventional mowers. This reduces the overall drag, resulting in an appreciable power savings. This also allows mowing at a higher speed in large areas, such as highway medians which do not require a very precise cut.

It will be appreciated that the above-described features may be implemented not only by manufacturing mowers according to the invention. Rather, a significant advantage provided with the invention is that it can be applied to preexisting mowers.

For example, with a method according to the invention, it is possible to remove a horizontal cutting blade and replace it with a support arm that includes downwardly projecting cutting elements, such as those described above. Alternatively, a conventional horizontal cutting blade may be modified to include the cutting elements positioned as described above. This can be achieved, for example, by adjusting the relative height of the blade, and then drilling or tapping holes along the preexisting cutting blade to fixedly attach cutting elements with a conventional fastener.

It has been discovered that by modifying a preexisting mower in this manner, it is possible to entirely replace a large internal combustion motor with a smaller, electric motor. This results in substantial power savings, reduces noise and air pollution, and increases the maneuverability of the mower. It further provides an extremely inexpensive method by which older mowers may be renovated. For example, it allows one to refit a mower with an internal combustion motor when the motor has worn out.

As can be appreciated from the foregoing description, many variations and alternative arrangements may be utilized without departing from the spirit and scope of the present invention. For example, while it has been found that an optimum number of four cutting pairs should be used when about a twenty inch cutting width is desired, this number can be increased for larger mowers or when lower rotational speeds are utilized. Also, the number of cutting pairs should be reduced to three or two for smaller mowers. Other changes and modifications can be made without departing from the spirit and scope of the invention. It should therefore be understood that this description is merely illustrative of the invention as particularly set forth in the appended claims.

What is claimed is:

1. A blade assembly for a rotary mower, comprising:

a rotating support structure with means to be affixed to a rotary drive shaft at a height sufficient to avoid contact of the support structure with vegetation to be cut by the blade assembly, the support structure being rotatable about an axis; and a plurality of cutting elements projecting downwardly from the support structure, each cutting element projecting outwardly along a radius from said axis and extending a distance such that the cutting elements are positioned at a sufficient height to avoid contact with the ground, said downwardly projecting cutting elements having sharpened edges that provide the only sharpened surfaces of the rotary mower for cutting vegetation.

2. The blade assembly according to claim 1, wherein the cutting elements each have a sharpened surface disposed at a substantially acute angle relative to the axis of rotation of the support structure, whereby vegetation is cut as the blade assembly rotates and moves forward across an area of vegetation.

3. The blade assembly according to claim 2, wherein said sharpened surface of each cutting element is disposed at an acute angle relative to a transverse axis of said support structure.

4. The blade assembly according to claim 2, wherein said sharpened surface defines a straight edge.

5. The blade assembly according to claim 2, wherein said cutting element is generally planar and said sharpened surface defines a curved edge in a plane containing said cutting element, said curved edge being configured to facilitate dropping of grass clippings.

6. The blade assembly according to claim 2, wherein the acute angle relative to the axis of rotation of the support structure is between 20° and 50°.

7. The blade assembly according to claim 6, wherein the acute angle relative to the axis of rotation of the support structure is about 40°.

8. The blade assembly according to claim 1, wherein pairs of said cutting elements are provided symmetrically along the support structure at varying radial distances from the axis of rotation.

9. The blade assembly according to claim 8, wherein four pairs of cutting elements are provided symmetrically along the support structure.

10. A blade assembly for a rotary mower, comprising:
a rotating support structure with means to be affixed to a rotary drive shaft at a height sufficient to avoid contact of the support structure with vegetation to be cut by the blade assembly, the support structure being rotatable about an axis: and
a plurality of cutting elements projecting downwardly from the support structure a distance such that the cutting elements are positioned at a sufficient height to avoid contact with the ground,
wherein the cutting elements are provided asymmetrically at varying distances along the support structure.

11. A rotary mower having less rotational and translational drag, comprising:
a frame supported by a plurality of wheels;
means for moving the frame forward across an area of vegetation to be mowed;
means for providing rotation to a drive shaft having a longitudinal axis disposed substantially perpendicularly with respect to said area of vegetation;
a support structure fixedly disposed symmetrically about said drive shaft at a height sufficient to avoid contact of the support structure with vegetation to be cut by the mower, said drive shaft rotating the support structure about said longitudinal axis of said drive shaft; and
a plurality of cutting elements projecting downwardly from the support structure, each cutting element projecting outwardly along a radius from said axis and extending a distance such that the cutting elements are positioned at a sufficient height to avoid contact with the ground;
wherein the cutting elements each have a sharpened lower end comprising a sharpened surface disposed at a substantially acute angle relative to the axis of rotation of the drive shaft, said sharpened edges providing the only sharpened surfaces of the rotary mower for cutting vegetation, whereby vegetation is cut as the blade rotates and moves forward across an area of vegetation.

12. The rotary mower as set forth in claim 11, further comprising a matting means for bending vegetation as the mower is moved forward, whereby a portion of said vegetation is bent away from a vertical orientation by said matting means so as to be positioned substantially perpendicularly to said downwardly projecting cutting elements as said cutting elements rotate about said longitudinal axis of said drive shaft.

13. The rotary mower as set forth in claim 11, wherein said sharpened surface of each cutting element is disposed at an acute angle relative to a transverse axis of said support structure.

14. The rotary mower as set forth in claim 11, wherein said sharpened surface defines a straight edge.

15. The rotary mower as set forth in claim 11, wherein said cutting elements are each generally planar and said sharpened surface defines a curved edge in a respective plane containing said cutting elements.

16. The rotary mower as set forth in claim 11, wherein the acute angle relative to the axis of rotation of the drive shaft is between 20° and 50°.

17. The rotary mower as set forth in claim 16, wherein the acute angle relative to the axis of rotation of the drive shaft is about 40°.

18. The rotary mower as set forth in claim 11, wherein pairs of said cutting elements are provided symmetrically along the support structure.

19. The rotary mower as set forth in claim 18, wherein four pairs of cutting elements are provided symmetrically along the support structure.

20. A rotary mower having less rotational and translational drag, comprising:
a frame supported by a plurality of wheels;
means for moving the frame forward across an area of vegetation to be mowed;
means for providing rotation to a drive shaft having a longitudinal axis disposed substantially perpendicularly with respect to said area of vegetation;
a support structure fixedly disposed symmetrically about said drive shaft at a height sufficient to avoid contact with vegetation cut by the mower, said drive shaft rotating the support structure about said longitudinal axis of said drive shaft; and
a plurality of cutting elements projecting downwardly from the support structure a distance such that the cutting elements are positioned to avoid contact with the ground;
wherein the cutting elements each have a sharpened surface disposed at a substantially acute angle relative to the axis of rotation of the drive shaft whereby vegetation is cut as the blade rotates and moves forward across an area of vegetation;
wherein the cutting elements are provided asymmetrically at varying distances along the support structure.

21. A method of reducing rotational and translational drag in a rotary mower, comprising the steps of:
removing a first substantially planar cutting blade formerly attached to a rotary drive shaft of said mower; and
replacing said first cutting blade with a second blade;
wherein said second blade includes:
a support structure fixedly disposed symmetrically about the rotary drive shaft at a height sufficient to avoid contact with vegetation cut by the second blade, the rotary drive shaft rotating the support structure about an axis;
a plurality of cutting elements projecting downwardly from the support structure, each cutting element projecting outwardly along a radius from said axis and extending to a distance such that the cutting elements are positioned at a sufficient height to avoid contact with the ground, wherein the cutting elements each have a sharpened lower end comprising a sharpened surface disposed at a substantially acute angle relative to the axis of rotation of the drive shaft, said sharpened edges providing the only sharpened surfaces of the rotary mower for cutting vegetation, whereby vegetation is cut as the blade rotates and moves forward across an area of vegetation.

22. The method according to claim 21, further comprising the step of providing each of the cutting elements with a sharpened surface disposed at a substantially acute angle relative to the axis of rotation of the drive shaft whereby vegetation is cut as the blade rotates and moves forward across an area of vegetation.

23. The method according to claim 21, further comprising the step of replacing an original power source which rotates said rotary drive shaft with a substitute power source that operates at a substantially reduced power level.

24. The method according to claim 23, wherein said original power source is an internal combustion motor and said substitute power source is an electric motor, and said replacing step comprises replacing said internal combustion motor with said electric motor.

25. The rotary mower as set forth in claim 12, wherein said matting means comprises an extension of a front portion of said frame, said extension having a curved lower surface which extends upwardly in a forward direction for reducing drag while bending vegetation.

* * * * *